United States Patent
Yana Motta et al.

(10) Patent No.: US 9,725,631 B2
(45) Date of Patent: Aug. 8, 2017

(54) HEAT TRANSFER COMPOSITIONS AND METHODS

(71) Applicant: HONEYWELL INTERNATIONAL INC., Morristown, NJ (US)

(72) Inventors: Samuel F. Yana Motta, East Amherst, NY (US); Mark W. Spatz, East Amherst, NY (US); Ronald P. Vogl, Springville, NY (US); Elizabet del Carmen Vera Becerra, Williamsville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/562,201

(22) Filed: Dec. 5, 2014

(65) Prior Publication Data

US 2015/0089965 A1 Apr. 2, 2015

Related U.S. Application Data

(63) Continuation of application No. 13/099,218, filed on May 2, 2011, now abandoned, which is a continuation-in-part of application No. PCT/US2010/034120, filed on May 7, 2010, which is a continuation of application No. 12/511,954, filed on Jul. 29, 2009, said application No. 13/099,218 is a continuation of application No. 12/511,954, filed on Jul. 29, 2009.

(60) Provisional application No. 61/329,955, filed on Apr. 30, 2010, provisional application No. 61/247,816, filed on Oct. 1, 2009, provisional application No. 61/240,786, filed on Sep. 9, 2009, provisional application No. 61/176,773, filed on May 8, 2009.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/104* (2013.01); *C09K 2205/126* (2013.01); *C09K 2205/22* (2013.01); *C09K 2205/40* (2013.01); *F25B 2345/001* (2013.01)

(58) Field of Classification Search
CPC ................ C09K 5/045; C09K 2205/22; C09K 2205/126
See application file for complete search history.

(56) References Cited

U.S. PATENT DOCUMENTS 8,980,118 B2 * 3/2015 Yana Motta ........... C09K 5/045
252/67
2010/0122545 A1 * 5/2010 Minor ...................... C08J 9/146
62/324.1

* cited by examiner

*Primary Examiner* — John Hardee
(74) *Attorney, Agent, or Firm* — Colleen D. Szuch

(57) ABSTRACT

Compositions, methods and systems which comprise or utilize a multi-component mixture comprising: (a) from about 10% to about 35% by weight of HFC-32; (b) from about 10% to about 35% by weight of HFC-125; (c) from about 20% to about 50% by weight of HFO-1234ze, HFO-1234yf and combinations of these; (d) from about 15% to about 35% by weight of HFC-134a; and optionally (e) up to about 10% by weight of CF3I and up to about 5% by weight of HFCO-1233ze, with the weight percent being based on the total of the components (a)-(e) in the composition.

10 Claims, No Drawings

HEAT TRANSFER COMPOSITIONS AND METHODS

RELATED APPLICATIONS

This application is a Continuation of U.S. application Ser. No. 13/099,218, filed May 2, 2011, now abandoned, which is related to as a continuation-in-part of and claims the priority benefit of each of (1) International Application No. PCT/US10/34120, filed May 7, 2010, which in turn claims the benefit of U.S. Provisional Application Ser. No. 61/240,786, filed Sep. 9, 2009, 61/247,816, filed Oct. 1, 2009, 61/329,955, filed Apr. 30, 2010; and (2) U.S. application Ser. No. 12/511,954, filed Jul. 29, 2009 (currently pending), which in turn claims the priority benefit of U.S. Provisional Application Ser. No. 61/176,773, filed May 8, 2009. Each of the above-identified applications is incorporated in its entirety herein by reference.

FIELD OF THE INVENTION

This invention relates to compositions, methods and systems having utility in refrigeration applications, with particular benefit in medium and low temperature refrigeration applications, and in particular aspects to refrigerant compositions for replacement of refrigerant HFC-404A for heating and cooling applications and to retrofitting medium and low temperature refrigerant systems, including systems designed for use with HFC-404A.

BACKGROUND

Mechanical refrigeration systems, and related heat transfer devices such as heat pumps and air conditioners, using refrigerant liquids are well known in the art for industrial, commercial and domestic uses. Fluorocarbon based fluids have found widespread use in many residential, commercial and industrial applications, including as the working fluid in systems such as air conditioning, heat pump and refrigeration systems. Because of certain suspected environmental problems, including the relatively high global warming potentials associated with the use of some of the compositions that have heretofore been used in these applications, it has become increasingly desirable to use fluids having low or even zero ozone depletion and global warming potentials, such as hydrofluorocarbons ("HFCs"). For example, a number of governments have signed the Kyoto Protocol to protect the global environment and setting forth a reduction of CO2 emissions (global warming). Thus, there is a need for a low- or non-flammable, non-toxic alternative to replace certain of high global warming HFCs.

One important type of refrigeration system is known as a "low temperature refrigeration system." Such systems are particularly important to the food manufacture, distribution and retail industries in that they play a vital role in ensuring that food which reaches the consumer is both fresh and fit to eat. In such low temperature refrigeration systems, a commonly used refrigerant liquid has been HFC-404A (the combination of HFC-125:HFC-143a:HFC134a in an approximate 44:52:4 weight ratio is referred to in the art as HFC-404A or R-404A). R-404A has an estimated high Global Warming Potential (GWP) of 3922.

There has thus been an increasing need for new fluorocarbon and hydrofluorocarbon compounds and compositions that are attractive alternatives to the compositions heretofore used in these and other applications. For example, it has become desirable to retrofit chlorine-containing refrigeration systems by replacing chlorine-containing refrigerants with non-chlorine-containing refrigerant compounds that will not deplete the ozone layer, such as hydrofluorocarbons (HFC's). Industry in general and the heat transfer industry in particular are continually seeking new fluorocarbon based mixtures that offer alternatives to, and are considered environmentally safer substitutes for, CFCs and HCFCs. It is generally considered important, however, at least with respect to heat transfer fluids, that any potential substitute must also possess those properties present in many of the most widely used fluids, such as excellent heat transfer properties, chemical stability, low- or no-toxicity, non-flammability and/or lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirably for CFC refrigerant substitutes to be effective without major engineering changes to conventional vapor compression technology currently used with CFC refrigerants.

Flammability is another important property for many applications. That is, it is considered either important or essential in many applications, including particularly in heat transfer applications, to use compositions which are non-flammable. Thus, it is frequently beneficial to use in such compositions compounds which are nonflammable. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are not nonflammable as that term is used herein. For example, the fluoroalkane difluoroethane (HFC-152a) and the fluoroalkene 1,1,1-trifluorpropene (HFO-1243zf) are each flammable and therefore not viable for use in many applications.

Applicants have thus come to appreciate a need for compositions, and particularly heat transfer compositions, that are highly advantageous in heating and cooling systems and methods, particularly vapor compression heating and cooling systems, and even more particularly low temperature refrigerant systems, including systems which are used with and/or have been designed for use with HFC-404A.

SUMMARY

Applicants have found that the above-noted needs, and other needs, can be satisfied by compositions, methods and systems which comprise or utilize a multi-component mixture comprising: (a) from about 10% to about 35% by weight of difluoromethane (HFC-32); (b) from about 10% to about 35% by weight of pentafluoroethane (HFC-125); (c) from about 20% to about 50% by weight of HFO-1234ze, HFO-1234yf and combinations of these; (d) from about 15% to about 35% by weight of 1,1,1,2-tetrafluoroethane (HFC-134a); and optionally (e) up to about 10% by weight of $CF_3I$ and up to about 5% by weight of HFCO-1233ze, with the weight percent being based on the total of the components (a)-(e) in the composition.

In certain preferred embodiments, the compositions comprise a multi-component mixture comprising: (a) from about 15% to about 25% by weight of HFC-32; (b) from about 10% to about 30% by weight of HFC-125; (c) from about 20% to about 50% by weight of HFO-1234ze, HFO-1234yf, and combinations of these; (d) from about 15% to about 35% by weight of HFC-134a; and optionally (e) up to about 5% by weight of CF3I and up to about 5% by weight of HFCO-1233ze, with the weight percent being based on the total of the components (a)-(e) in the composition.

The present invention provides also methods and systems which utilize the compositions of the present invention, including methods and systems for heat transfer and for retrofitting existing heat transfer systems. Certain preferred method aspects of the present invention relate to methods of providing relatively low temperature cooling, such as in low temperature refrigeration systems. Other preferred method aspects of the present invention provide methods of retrofitting an existing refrigeration system, preferably low temperature refrigeration systems, designed to contain and/or containing R-404A refrigerant comprising introducing a composition of the present invention into the system without substantial engineering modification of said existing refrigeration system.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

The term "HFO-1233" is used herein to refer to all trifluoro,monochloropropenes. Among the trifluoro,monochloropropenes are included 1,1,1trifluoro-2,chloro-propene (HFCO-1233xf), both cis- and trans-1,1,1-trifluo-3,chlororopropene (HFCO-1233zd). The term HFCO-1233zd is used herein generically to refer to 1,1,1-trifluo-3,chloropropene, independent of whether it is the cis- or trans-form. The terms "cisHFCO-1233zd" and "transHFCO-1233zd" are used herein to describe the cis- and trans-forms of 1,1,1-trifluo,3-chlororopropene, respectively. The term "HFCO-1233zd" therefore includes within its scope cisHFCO-1233zd, transHFCO-1233zd, and all combinations and mixtures of these.

DETAILED DESCRIPTION OF PREFERRED EMBODIMENTS

Low temperature refrigeration systems are important in many applications, such as to the food manufacture, distribution and retail industries. Such systems play a vital role in ensuring that food which reaches the consumer is both fresh and fit to eat. In such low temperature refrigeration systems, one of the refrigerant liquids which has been commonly used has been HFC-404A, which has an estimated high Global Warming Potential (GWP) of 3922. Applicants have found that the compositions of the present invention satisfy in an exceptional and unexpected way the need for alternatives and/or replacements for refrigerants in such applications, particularly and preferably HFC-404A, that at once have lower GWP values and provide substantially non-flammable, non-toxic fluids that have a close match in cooling capacity and/or efficiency to HFC-404A in such systems.

The present invention may also encompass medium temperature refrigeration composition, systems and methods. According to certain preferred embodiments, the present methods and systems involve evaporator temperatures of from above about −15° C. to about 5° C. An example of such a medium temperature system and method involves providing cooling in the fresh food compartment of a residential refrigerator.

Heat Transfer Compositions

The compositions of the present invention are generally adaptable for use in heat transfer applications, that is, as a heating and/or cooling medium, but are particularly well adapted for use, as mentioned above, in medium and low temperature refrigeration systems, and preferably in low temperature systems, that have heretofor used HFC-404A and/or systems that have heretofor used R-22.

Applicants have found that use of the components of the present invention within the broad and preferred ranges described herein is important to achieve the advantageous but difficult to achieve combinations of properties exhibited by the present compositions, particularly in the preferred systems and methods, and that use of these same components but substantially outside of the identified ranges can have a deleterious effect on one or more of the important properties of the compositions, systems or methods of the invention. Highly preferred combinations of properties are achieved for compositions having a weight ratio of HFC-32:HFC-125 of from about 0.9:1.2 to about 1.2:0.9, with a ratio of about 1:1 being preferred in certain embodiments. Applicants have found that highly preferred combinations of properties are also achieved for compositions having a weight ratio of HFO-1234ze:HFO-1234yf of from about 5:1 to about 3:1, with a ratio of about 4:1 being preferred in certain embodiments.

For the purposes of convenience, the combination HFO-1234ze and HFO-1234yf is referred to herein as the "tetrafluoropropene component" or "TFC," and in certain embodiments highly preferred combinations of properties can be achieved for composition which comprise a weight ratio of HFC-134a:TFC of from about 5:7 to about 1:1, with a ratio of about 4:6 being preferred in certain embodiments.

Although it is contemplated that either isomer of HFO-1234ze may be used to advantage in certain aspects of the present invention, applicants have found that it is preferred in certain embodiments that the HFO-1234ze comprise transHFO-1234ze, and preferably comprise transHFO-1234ze in major proportion, and in certain embodiments consist essentially of transHFO-1234ze.

As mentioned above, applicants have found that the compositions of the present invention are capable of achieving a difficult to achieve combination of properties, including particularly low GWP. By way of non-limiting example, the following Table A illustrates the substantial improvement in GWP exhibited by certain compositions of the present invention in comparison to the GWP of HFC-404A, which has a GWP of 3922.

TABLE A

| Composition of the Invention (weight fraction, based on identified components) | Name | GWP | GWP as a Percentage of R404A GWP |
|---|---|---|---|
| R125/R134a/R143a (0.44/0.04/0.52) | R404A | 3922 | |
| R32/R125/R134a/1234yf (0.25/0.25/0.2/0.3) | A1 | 1331 | 34% |
| R32/R125/R134a/1234ze (0.325/0.325/0.147/0.203) | A2 | 1568 | 40% |
| R32/R125/R134a/1234ze/1234yf (0.3/0.3/0.168/0.16/0.072) | A3 | 1494 | 38% |
| R32/R125/R134a/1234yf (0.13/0.13/0.3/0.44) | A4 | 974 | 25% |
| R32/R125/R134a/1234ze (0.125/0.125/0.315/0.435) | A5 | 975 | 25% |
| R32/R125/R134a/1234ze/1234yf (0.125/0.125/0.315/0.3/0.135) | A6 | 975 | 25% |

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent. Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Other additives not mentioned herein can also be included by those skilled in the art in view of the teachings contained herein without departing from the novel and basic features of the present invention.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-404. The preferred compositions of the present invention tend to exhibit many of the desirable characteristics of R-404A but have a GWP that is substantially lower than that of R-404A while at the same time having a capacity and/or efficiency that is substantially similar to or substantially matches, and preferably is as high as or higher than R-404A. In particular, applicants have recognized that certain preferred embodiments of the present compositions tend to exhibit relatively low global warming potentials ("GWPs"), preferably less than about 2500, more preferably less than about 2400, and even more preferably not greater than about 2300. In certain embodiments, the present compositions have a GWP of about 1500 or less, and even more preferable of less than about 1000.

In certain other preferred embodiments, the present compositions are used in refrigeration systems which had contained and/or had originally been designed for use with R-404A. Preferred refrigeration compositions of the present invention may be used in refrigeration systems containing a lubricant used conventionally with R-404A, such as mineral oils, polyalkylbenzene, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), and the like.

As mentioned above, the present invention achieves exceptional advantage in connection with systems known as low temperature refrigeration systems. As used herein the term "low temperature refrigeration system" refers to vapor compression refrigeration systems which utilize one or more compressors and a condenser temperature of from about 35° C. to about 45° C. In preferred embodiments of such systems, the systems have an evaporator temperature of from about −40° C. and less than about −15° C., more preferably from about −35° C. to about −25° C., with an evaporator temperature preferably of about −32° C. Moreover, in preferred embodiments of such systems, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 15° C. to about 25° C., with a degree of superheat in the suction line preferably of from about 20° C. to about 25° C.

EXAMPLES

The following examples are provided for the purpose of illustrating the present invention but without limiting the scope thereof.

Example 1

Performance Parameters

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988).

A low temperature refrigeration system is provided. In the case of such a system illustrated in this Example, the condenser temperature is set to 40.55° C., which generally corresponds to an outdoor temperature of about 35° C. The degree of subcooling at the expansion device inlet is set to 5.55° C. The evaporating temperature is set to −31.6° C., which corresponds to a box temperature of about −26° C. The degree of superheat at evaporator outlet is set to 5.55° C. The degree of superheat in the suction line is set to 13.88° C., and the compressor efficiency is set to 65%. The pressure drop and heat transfer in the connecting lines (suction and liquid lines) are considered negligible, and heat leakage through the compressor shell is ignored. Several operating parameters are determined for the compositions A1-A6 identified in Table A above in accordance with the present invention, and these operating parameters are reported in Table 1 below, based upon HFC-404A having a COP value of 100%, a capacity value of 100% and a discharge temperature of 97.6° C.

TABLE 1

| Name | GWP | Evaporator Glide (° C.) | Capacity (%) | COP (%) |
|---|---|---|---|---|
| R404A | 3922 | 0.5 | 100% | 100% |
| A1 | 1331 | 3.3 | 105% | 108% |
| A2 | 1568 | 4.7 | 107% | 108% |
| A3 | 1494 | 4.2 | 106% | 108% |
| A4 | 974 | 2.8 | 82% | 109% |
| A5 | 975 | 4.2 | 68% | 110% |
| A6 | 975 | 3.6 | 73% | 109% |

As can be seen from the Table 1 above, applicants have found that the compositions of the present invention are capable of at once achieving many of the important refrigeration system performance parameters close to the parameters for R-404A, and in particular sufficiently close to permit such compositions to be used as a drop-in replacement for R-404A in low temperature refrigeration systems and/or for use in such existing systems with only minor system modification. For example, compositions A1-A3 exhibit capacities and efficiencies (COPs) in this low temperature refrigeration system that are within about 8%, and even more preferably within about 6% of that of R404A, and preferably within such limits but higher than the capacity of the R404A. Especially in view of the improved GWP of compositions A1-A3, these compositions of the present invention are excellent candidates for use as drop-in replacements for low temperature refrigeration systems originally containing and/or designed to contain R-404A. On the other hand, compositions A4-A6 have lower capacity (68% to 82%) and superior efficiency (9% to 10% higher) while at the same time exhibiting substantial improvement in GWP, preferably as shown having a GWP of less than about 1000, which minimizes the total environmental impact. Compositions A3-A6 of the present invention are excellent candidates for use in retrofitting of low temperature refrigeration systems originally containing and/or designed to contain R-404A but with only minor adjustment of the system, such as some re-sizing of certain system components, such as compressors and expansion valves.

Since many existing low temperature refrigeration systems have been designed for R-404A, or for other refrigerants with properties similar to R-404A, those skilled in the art will appreciate the substantial advantage of a refrigerant with low GWP and superior efficiency which can be used as replacement for R-404A or like refrigerants with relatively minimal modifications to the system. Furthermore, those skilled in the art will appreciate that the present compositions are capable of providing substantial advantage for use in new or newly designed refrigeration systems, including preferably, low temperature refrigeration systems.

Example 2

Retrofit Parameters

It is contemplated that in certain embodiments the present invention provides retrofitting methods which comprise removing at least a portion of the existing refrigerant from the system and replacing at least a portion of the removed refrigerant with a composition of the present invention, preferably without substantial modification of the system and even more preferably without any change in major system components, such as compressors, condensers, evaporators, and expansion valves. Due to certain characteristics of low temperature refrigeration systems, including particularly low temperature refrigeration systems containing or designed to contain R404A refrigerant, it is important in certain embodiments that such systems are capable of exhibiting reliable system operating parameters with drop-in refrigerants. Such operating parameters include:

High-Side Pressure that is within about 105%, and even more preferably within about 103% of the high side pressure of the system using R404A. This parameter is important in such embodiments because it allows the use of existing pressure components.

Evaporator superheat that is greater than about 0° C. when using a properly sized R404A expansion valve, which permits the use of the compositions of the present invention without the need to replace existing valves, thereby minimizing retrofit cost and impact.

Discharge Temperature that is preferably lower than about 130° C., and even more preferably lower than about 125° C. The advantage of such a characteristic is that it permits the use of existing equipment without activation of the thermal protection aspects of the system, which are preferably designed to protect compressor components. This parameter is advantageous in that it avoids the use of costly controls such as liquid injection to reduce discharge temperature.

The above-noted and other operating parameters are determined for the compositions A1-A6 identified in Table A above in accordance with the present invention, and these operating parameters is reported in Table 2 below:

TABLE 2

| Name | Discharge Pressure (%) | Discharge Temp. (° C.) | Suction Pressure (%) | Mass Flow (%) | Liquid Density at TXV Inlet (%) | Superheat (° C.) |
|---|---|---|---|---|---|---|
| R404A | 100% | 91.9 | 100% | 100% | 100.0% | 5.55 |
| HDR-21 | 100% | 113.1 | 89% | 79% | 108.6% | 1.19 |
| HDR-31 | 100% | 123.5 | 89% | 73% | 100.1% | 0.25 |
| HDR-34 | 100% | 120.2 | 88% | 74% | 102.4% | 0.41 |

TABLE 2-continued

| Name | Discharge Pressure (%) | Discharge Temp. (° C.) | Suction Pressure (%) | Mass Flow (%) | Liquid Density at TXV Inlet (%) | Superheat (° C.) |
|---|---|---|---|---|---|---|
| HDR-23 | 81% | 101.8 | 69% | 67% | 110.3% | −3.51 |
| HDR-33 | 69% | 106.5 | 54% | 52% | 105.1% | −9.01 |
| HDR-36 | 74% | 104.5 | 59% | 57% | 106.4% | −6.92 |

In certain preferred embodiments the replacement step is a drop-in replacement in the sense that no substantial redesign or modification of the system is required and no major item of equipment needs to be replaced in order to accommodate the refrigerant of the present invention. That is the case with the compositions A1-A3, which in general can be used in most retrofit procedures without any change of major components. In all compositions A1-A3, the discharge pressure and temperature is below the limit and the expansion valve will produce enough superheat at the outlet of the evaporator.

While compositions A4-A6 provide relatively good replacement performance, the use of such compositions as a replacement for R-404A in many low temperature systems will require at least a new expansion device. As such, these compositions will provide advantage where the change of the expansion valve and/or other equipment is possible. Of course, all of the compositions A1-A6 provide excellent advantage for use in new equipment.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

What is claimed is:

1. A refrigerant consisting essentially of: (a) about 13.0% by weight of HFC-32; (b) about 13.0% by weight of HFC-125; (c) about 30% by weight of HFC-134a; and (d) about 44% by weight HFO-1234yf with the weight percent being based on the total of the components (a)-(d) in the composition, wherein said refrigerant has a GWP of not greater than 1000.

2. A heat transfer composition comprising the refrigerant of claim 1 and further comprising at least one polyol ester lubricant.

3. The refrigerant of claim 1 having a coefficient of performance, based upon HFC-404A, of about 100% or greater.

4. A method of replacing an existing refrigerant fluid contained in heat transfer system comprising removing at least a portion of said existing refrigerant fluid from said system, said existing refrigerant fluid being HFC-404A and replacing at least a portion of said existing refrigerant fluid by introducing into said system a refrigerant comprising: (a) about 13.0.% by weight of HFC-32; (b) about 13.0% by weight of HFC-125; (c) about 30% by weight of HFC-134a; and (d) about 44% by weight HFO-1234yf, with the weight percent being based on the total of the components (a)-(d) in the composition.

5. The method of claim 4 wherein said existing heat transfer system further comprises in said system at least one polyol ester lubricant.

6. The method of claim 4 wherein said heat transfer system comprises a low temperature refrigeration system, a medium temperature refrigeration system, or an air conditioning system.

7. A low temperature refrigeration, medium temperature refrigeration or air conditioning heat transfer system comprising a compressor, a condenser and an evaporator in fluid communication, and a heat transfer composition in said system, said heat transfer composition comprising a refrigerant consisting essentially of: (a) about 13.0% by weight of HFC-32; (b) about 13.0% by weight of HFC-125; (c) about 30% by weight of HFC-134a; and (d) about 44% by weight HFO-1234yf, with the weight percent being based on the total of the components (a)-(d) in the composition, said condenser having an operating temperature of from about 35° C. to about 45° C.

8. The heat transfer system of claim 7 wherein said heat transfer composition further comprises at least one polyol ester lubricant.

9. The heat transfer system of claim 7 wherein said evaporator has an operating temperature of from about −40° C. up to less than about −15° C.

10. The heat transfer system of claim 7 wherein said evaporator has an operating temperature of from about −35° C. to about −25° C.

* * * * *